United States Patent [19]

McLean et al.

[11] Patent Number: 4,741,879
[45] Date of Patent: May 3, 1988

[54] CATALYTIC IGNITERS AND THEIR USE TO IGNITE LEAN HYDROGEN-AIR MIXTURES

[75] Inventors: William J. McLean, Oakland; Lawrence R. Thorne; Joanne V. Volponi, both of Livermore, all of Calif.

[73] Assignee: The United States of America as represented by the United States Department of Energy, Washington, D.C.

[21] Appl. No.: 872,716

[22] Filed: Jun. 10, 1986

[51] Int. Cl.$^4$ .............................................. G21C 9/04
[52] U.S. Cl. .................................. 376/301; 423/580
[58] Field of Search ........................ 376/301; 423/580

[56] References Cited

U.S. PATENT DOCUMENTS

| | | |
|---|---|---|
| 620,511 | 2/1899 | Spier . |
| 1,039,612 | 9/1912 | Struller . |
| 1,399,727 | 12/1921 | Zahn . |
| 2,855,770 | 10/1958 | Grube . |
| 2,879,146 | 3/1959 | McElroy et al. . |
| 2,937,127 | 5/1970 | Flora . |
| 2,943,921 | 7/1960 | King . |
| 2,945,794 | 7/1960 | Winters et al. . |
| 3,098,810 | 7/1963 | McElroy et al. . |
| 3,857,927 | 12/1974 | Henrie .................. 376/301 |
| 4,119,706 | 10/1978 | Rogers . |
| 4,171,350 | 10/1979 | Sanders .................. 376/301 |
| 4,479,921 | 10/1984 | Allaire et al. . |

OTHER PUBLICATIONS

Jasionowski et al., Development of an Improved Ignition System, Institute of Gas Technology, Oct. 1978.
Tsuchiya et al., Nuclear Technology, vol. 58, Sep. 1982, pp. 397-403.

Primary Examiner—Deborah L. Kyle
Assistant Examiner—Richard W. Wendtland
Attorney, Agent, or Firm—Armand McMillan; James H. Chafin; Judson R. Hightower

[57] ABSTRACT

A catalytic igniter which can ignite a hydrogen-air mixture as lean as 5.5% hydrogen with induction times ranging from 20 s to 400 s, under conditions which may be present during a loss-of-liquid-coolant accident at a light water nuclear reactor comprises (a) a perforate catalytically active substrate, such as a platinum coated ceramic honeycomb or wire mesh screen, through which heated gases produced by oxidation of the mixture can freely flow and (b) a plurality of thin platinum wires mounted in a thermally conductive manner on the substrate and positioned thereon so as to be able to receive heat from the substrate and the heated gases while also in contact with unoxidized gases.

11 Claims, 4 Drawing Sheets

IGNITION APPARATUS

(Inverted Configuration)

FIG. 1

INITIAL AND OPTIMIZED IGNITER DESIGNS

ALTERNATIVE IGNITER DESIGNS

FIG. 3a   FIG. 3b   FIG. 3c

EFFECTS OF FLOW VELOCITY

FIG. 4

EFFECT OF HUMIDITY

CATALYTIC IGNITERS AND THEIR USE TO IGNITE LEAN HYDROGEN-AIR MIXTURES

BACKGROUND OF THE INVENTION

The U.S. Government has rights in this invention pursuant to Contract No. DE-AC04-76DP00789 between the U.S. Department of Energy and AT&T Technologies, Inc.

This invention relates to catalytic igniters suitable for igniting lean (4–13 vol %) hydrogen-air mixtures and to methods of catalytically igniting such gaseous mixtures.

During a loss-of-coolant accident (LOCA) in a light water nuclear reactor (LWR), there is the potential for rapid production of large quantities of hydrogen, produced from the reaction of water and steam with the fuel rod cladding. M. P. Sherman et al., NUREG/CR-1561, SAND 83-1495, Sandia National Laboratories, Albuquerque, N. Mex. (1980). The hydrogen production rate may be so rapid that a flammable or detonable mixture may be produced within hours as the hydrogen mixes with the air in the reactor core containment structure. If this mixture were ignited at hydrogen concentrations above about 13 vol %, an explosion could result that would compromise the structural integrity of the containment and cause serious safety and radiological hazards. Therefore, in the event of an LOCA, measures must be taken to either render the mixture non-flammable or dispose of the hydrogen.

One method for disposing of the hydrogen is to purposely ignite the mixture at hydrogen concentrations below which serious damage might result from the ensuing rise in pressure and temperature. Although a safe upper limit for the hydrogen concentration has not been established, it must be less than about 13 vol %, i.e., the concentration above which a transition from normal burning to detonation could occur. To allow a reasonable margin of safety, 9–10 vol % should be regarded as the safe upper limit. The deliberate ignition approach has already been implemented at several LWR sites by using electrically energized glowplugs located at various positions within the containment building. One disadvantage of glowplugs, however, is that to be operable they require a continuous source of electrical power, which power may not be available during a serious accident. Thus, a device that catalytically ignites lean hydrogen-air mixtures and therefore does not require an external source of power is needed. Such a device would have important applications in nuclear reactor safety.

Devices in the prior art for igniting gases can be grouped into three general categories, viz., burner igniters, as illustrated by U.S. Pat. Nos. 620,511; 1,039,612; 4,479,921; catalytic combustors, such as that disclosed in U.S. Pat. No. 4,479,921; and hydrogen recombiners, as disclosed in U.S. Pat. Nos. 2,879,146; 2,937,127; 2,943,921; 2,945,794; 3,098,810; 3,857,927; and 4,119,706. The burner igniters perform a comparable function to the device of this invention and thus are relevant prior art. The catalytic combustors do not produce gas phase ignition and generally require an initial pre-heat from an external source in order to operate. Thus, catalytic combustors are not relevant to the subject matter of this invention. Similarly, hydrogen recombiners are not relevant to the problem to which this invention is addressed because, although recombiners are routinely used to dispose of radiolytically produced hydrogen which accumulates in reactors that use water as a heat transfer fluid in or around the reactor core, their cost of construction is many magnitudes more than a simple glow igniter. Also, the processing rate of even the largest recombiners currently in use would be inadequate in an LOCA where the rate of hydrogen production may exceed 200 cubic feet per minute. In addition, a recombiner large enough to handle any foreseen LOCA would clearly not be cost effective since it would sit idle most of the time and might never be used at all. Furthermore, recombiners operate on a gas stream and not on a large volume of static gas, as may be encountered in an LOCA. Because of this, electrically-powered glowplug igniters rather than hydrogen recombiner have been installed in a number of light water nuclear reactors to intentionally ignite the hydrogen-air mixture produced in an LOCA.

Prior art catalytic burner igniters, on the other hand, perform the same general function, i.e., catalytically igniting flammable gaseous mixtures, as the catalytic igniters of this invention and therefore, theoretically at least, would be capable of being used for the same purpose. However, based on the structural requirements we have found to be required of a catalytic igniter in order to ignite lean hydrogen-air mixtures as might be encountered in a LOCA, it is readily apparent that earlier devices are not useful for this purpose.

All of the burner igniters of the above cited patents are adapted for the ignition of gas-air mixtures intended for street lighting, cooking or heating and not lean hydrogen-air mixtures. The chemical composition of the gas to be ignited is not specified, except in U.S. Pat. No. 620,511 where "illuminating-gas" is mentioned. Illuminating gas was used for street lighting before electricity was widely available. In all probability, city, town or carburetted water gas was used as illuminating gas. Town gas is usually reformed refinery gas and contains 30–50% $H_2$, methane and other light hydrocarbons, CO and $N_2$. Carburetted water gas has a similar composition with a 36% hydrogen content. Thus, the earlier igniters presumably would also ignite hydrogen-air mixtures. However, gaslights burn a jet of fuel as a diffusion flame so that the igniter is exposed to high concentraions of $H_2$. Thus, ignition occurs with the richest ignitable mixture, probably in the range of 15–25% $H_2$. By comparison, nuclear reactor safety applications require the ignition of hydrogen-air mixtures in the concentration range of 4.1–13% hydrogen. Thus, the hydrogen concentrations at which the early igniters operated were much higher than that which is safe for nuclear reactor safety applications. More importantly, because of their designs, the early igniters could not ignite the lean hydrogen-air mixtures (4.1–13% hydrogen) involved in LOCAs.

In the 4.1–13% hydrogen range, structures in the path of the flame front tend to extinguish the flame. In all of the prior patents cited above except one, (U.S. Pat. No. 20,511) there are fixtures surrounding the igniting element which would defeat any ability it might otherwise have to ignite lean hydrogen-air mixtures. In that one prior art exception, other structural features of igniter would render it inoperable to ignite lean hydrogen-air mixtures, for the reasons explained herein below.

All of the prior art burner igniters were designed to ignite a flowing gas stream, whereas the hydrogen-air mixture in a LOCA can be static. Our experimental results using the catalytic igniter of this invention have demonstrated that ignition is considerably more difficult for static gas mixtures than flowing gas mixtures.

Thus, because the earlier igniters were designed to ignite flowing, mixtures containing 15 or more percent hydrogen, it is apparent that they would be incapable of igniting the static, very lean hydrogen-air mixtures encountered in a LOCA. Without such capability, a catalytic igniter cannot be used effectively in a LWR.

Although the device of U.S. Pat. No. 620,511 has a platinum wire on a catalytic porous substrate, it nevertheless is unsuited for igniting lean hydrogen-air mixtures. For example, the patent does not disclose the length or diameter of the wire, which are extremely important design parameters. A wire too short or too thick renders the igniter unusable for igniting the important 4.1–13% hydrogen mixtures. For example, our experiments revealed that the minimum hydrogen concentration needed for ignition with a 4-cm long, 0.0127-cm diameter wire is 5.5% whereas 8.5% hydrogen content is required for a 2-cm long 0.0735-cm diameter wire.

The structural components surrounding the "ignition pill" of U.S. Pat. Nos. 1,039,612, 1,399,727 and 2,855,770 would extinguish any flame front initiated in a lean static hydrogen-air mixture in the range of 4–13% hydrogen. In such mixtures, flame front propagation is very sensitive to heat loss caused by objects in the path of propagation. Again, the dimensions of the platinum wire are not disclosed.

An "ignition-pill" of undisclosed composition is mentioned (p. 2, line 58) in this patent. Such an igniter would not have the requisite catalytic surface area to heat up in static lean hydrogen-air mixtures unless it were extremely porous (with millimeter - sized holes), a feature not disclosed in the patent.

In describing the igniting element of U.S. Pat. No. 1,399,727, (p. 1, col. 58), "fine" platinum wires are mentioned. However, the dimensions thereof are not disclosed and even disregarding the dampening effect of the surrounding structure, very fine wires are needed to ignite very lean hydrogen-air mixtures. As for the platinum black catalytic substrate mentioned in the patent, it generally has a typical surface area of 25 square meters per gram. The surface area of the platinum used on modern catalytic substrate, such as the one employed in the igniter of this invention is 5–10 times higher. The higher surface area makes the substrate much more catalytically active and therefore it will warm in a very lean hydrogen mixture. This is critically important for use in LWR.

The resistance of the substrate to the flow of gas therethrough, its catalytic activity and its placement relative to the platinum wire are also critical when lean, static hydrogen-air mixtures are involved. In order for a catalytic igniter to be acceptable for use in a LWR during a LOCA, it must be capable of igniting a static hydrogen-air mixture containing 10% hydrogen and should cause the ignition within 30 minutes. An igniter, such as disclosed in U.S. Pat. No. 620,511, in which heated gases are partially oxidized by the substrate but which cannot flow uninhibited therethrough by convection currents alone is incapable of igniting a static gas mixture. Also, the physical relationship of the platinum wire to both the oxidized gases and the unoxidized gas mixture becomes ever more critical, as the gas mixture becomes more lean. U.S. Pat. No. 620,511 contains no teaching of this critical relationship or how it might be achieved with its igniter, because neither that patent nor the igniter disclosed therein was concerned with either static or with very hydrogen-lean gaseous mixtures.

OBJECTS OF THE INVENTION

It is an object of the invention to provide a novel catalytic igniter for very lean hydrogen-air gaseous mixtures.

It is another object to provide such an igniter adapted to ignite lean hydrogen-air gaseous mixtures.

It is a further object to provide such an igniter which will ignite such gaseous mixtures which are slowly flowing or static.

It is still a further object to provide such an igniter which is of inexpensive, uncomplicated construction but which will remain operational after being exposed for long periods of time to ambient air.

It is yet another object to provide such an igniter which will reliably ignite, within a few minutes or less, a contained volume of such a gaseous mixture which contains as little as 5 vol % hydrogen.

Another object is the provision of a non-electrically dependent method of preventing a build of an explosive concentration of hydrogen in a light water nuclear reactor after a loss-of-coolant accident.

Other objects will be apparent to those skilled in the art to which this invention pertains.

SUMMARY OF THE INVENTION

In an article of manufacture aspect, this invention relates to a catalytic igniter adapted for igniting a contained lean hydrogen-air gaseous mixture in a containing structure comprising:

(a) a non-combustible perforate catalytic substrate through which such a gaseous mixture can freely flow by convection current alone and having a catalytically active surface with surface area of at least about 50 $m^2/g$, effective to raise the temperature of the substrate from ambient temperature to above about 80° C. within 200 seconds after the substrate is contacted with such a gaseous mixture; and (b) at least one catalytically active platinum surfaced metal wire mounted, in a thermally conductive manner, on the portion of substrate which becomes heated when contacted with a lean hydrogen-air gaseous mixture when the igniter is mounted in the containing structure and positioned relative to the substrate so as to be in thermally conductive communication with heated gases which have passed through the substrate and to be in catalytically effective communication with gases which have not passed through the substrate, the catalytic surface area of the wire being effective to raise the temperature of the wire to at least red heat in a hydrogen-air mixture containing at least 5 vol % hydrogen only after the temperature of the substrate rises to about 80° C. while in such a gaseous mixture.

In a method aspect, this invention relates to a method of igniting a volume of gaseous hydrogen-air mixture containing between 4 and 13 vol % hydrogen in a structure containing the gaseous mixture which comprises contacting the gaseous mixture with a catalytic igniter of this invention.

BRIEF DESCRIPTION OF THE DRAWINGS

Various other objects, features and attendant advantages of the present invention will become more fully appreciated as the same becomes better understood when considered in conjunction with the accompanying drawings, wherein.

Figure 2A:
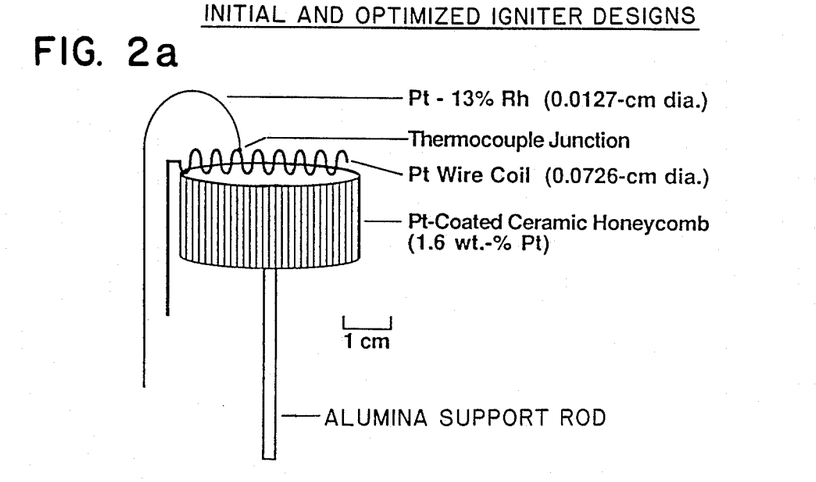
FIGS. 2a and 2b are schematic drawings of initial and optimized igniter designs according to this invention.

The igniter of FIG. 2a is a platinum-coated honeycomb substrate to which is mounted a platinum wire coil and a platinum - 13% rhodium wire. The temperature of the platinum wire coil was measured by the thermocouple junction formed by the platinum - 13% rhodium wire welded to the platinum wire coil.

Figure 4:
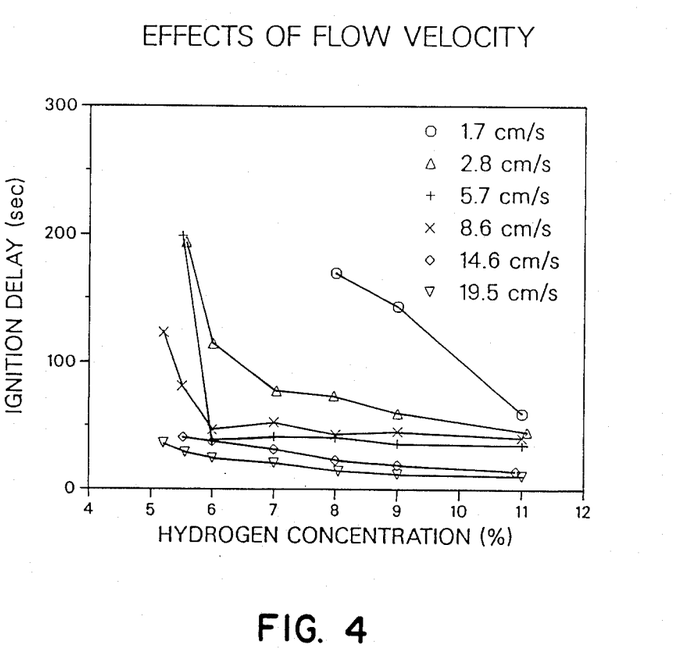
FIG. 4 is a graph showing the effects of gas flow velocity on ignition delay time and minimum ignitable hydrogen concentrations.

The graph of FIG. 4 shows the effect of gas flow rate on igniter performance. Low hydrogen concentrations at low flow velocities are most difficult to ignite. Gas temperature was 23° C. and the relative humidity was less than 5%.

Figure 5:
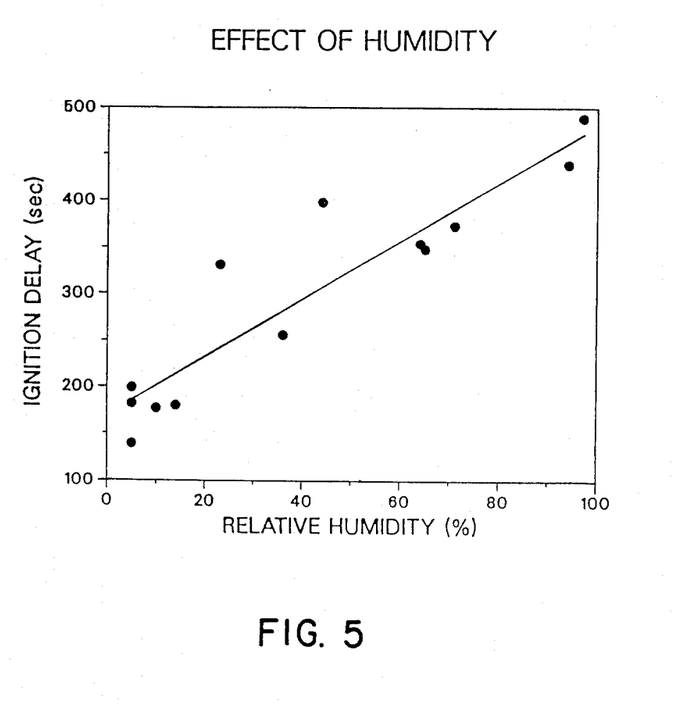
FIG. 5 is a graph showing the effect of humidity on ignition delay time.

The graph of FIG. 5 shows the effect of humidity on ignition delay time. Humidified mixtures are more difficult to ignite. The gas flow velocity was 2.8 cm/s and the hydrogen concentration was 8%. The temperature of the flow stream was varied to achieve the desired relative humdity.

Figure 6:
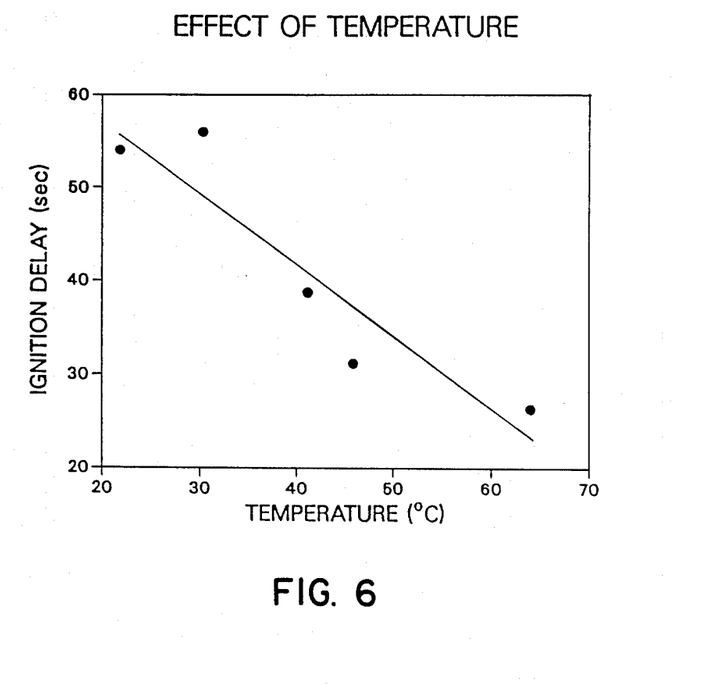
FIG. 6 is a graph showing the effect of gas temperature on ignition delay time.

The graph of FIG. 6 shows the effect of gas mixture temperature. Warmer mixtures are easier to ignite than cooler mixtures. The flow velocity was 2.8 cm/s, the hydrogen concentration was 8% and the relative humidity less than 5%.

Figures 3A, 3B:
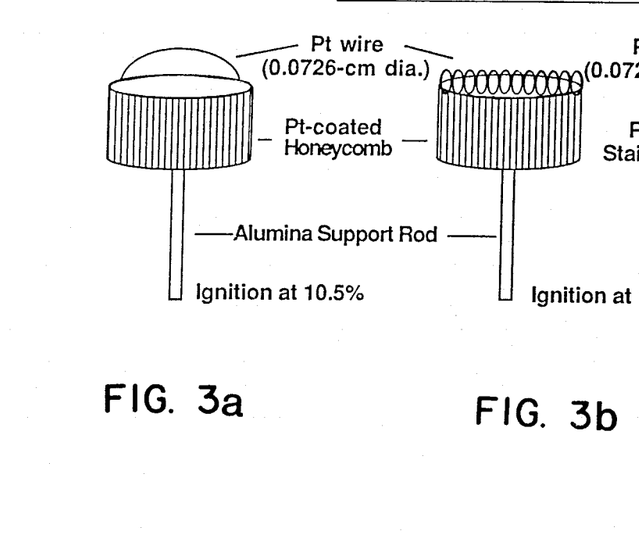
FIGS. 3a, 3b and 3c are schematic drawings of three other igniter designs according to this invention.
Figure 3C:
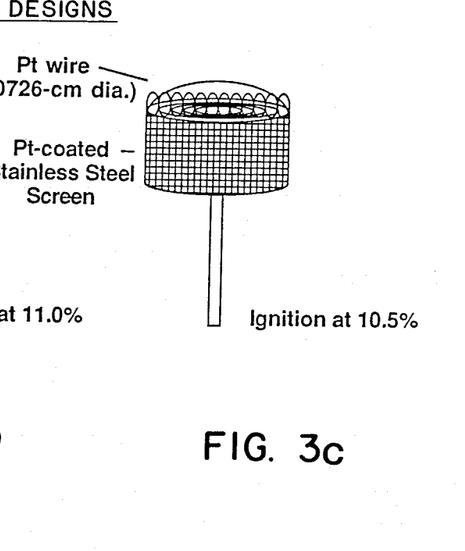

Igniters otherwise corresponding to those of FIGS. 3a and 3c but lacking the Pt wire would not ignite lean hydrogen-air mixtures (4-13 vol % H$_2$).

DETAILED DESCRIPTION

Figure 1:
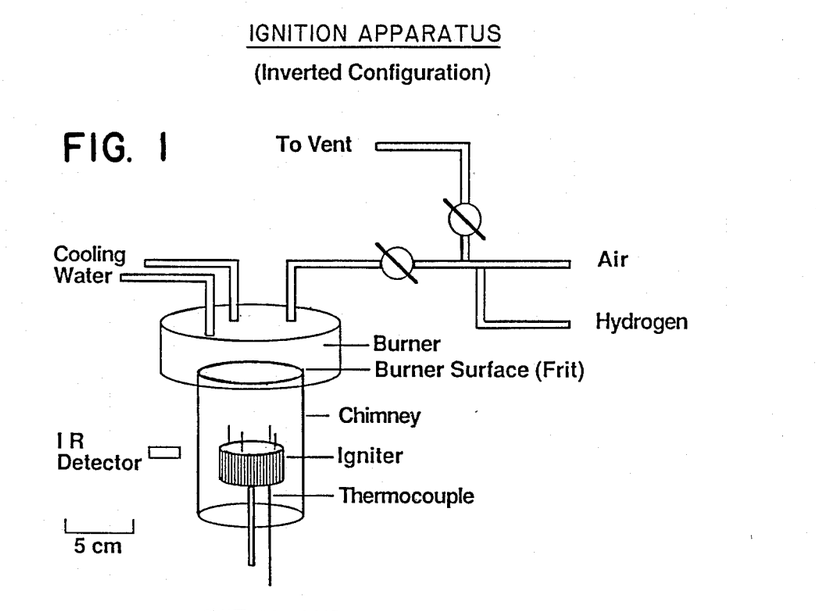
FIG. 1 is a schematic illustration of the apparatus employed to test the performance of catalytic igniters according to this invention.

Several catalytic igniters were tested in the apparatus shown schematically in FIG. 1, the ignition delay time, i.e., the time required for the igniter to ignite the mixture, was taken as a measure of the igniter's performance. The test apparatus consisted of a burner, to which was attached a quartz chimney. The burner was not employed as a burner per se, but as a stop for the flame front which propagates away from the igniter toward the burner surface when ignition occurs.

The hydrogen concentration was controlled by regulating with valve 4 the flow of air and hydrogen supplied to the burner. "Tylan" mass flow meters (not shown) were used to monitor the mass flows of hydrogen and air. The meters were calibrated by setting the flow control valve for a specific flow rate while the flow was directed through a wet test meter which measured the total volume of gas delivered. The time required for the delivery of a specific volume was then measured. The volume delivered divided by the elapsed time gave the flow rate which was corrected for standard temperature and pressure using the ideal gas law. The meter was then adjusted to read this corrected value.

The lean ignition limit of hydrogen was determined for the test apparatus because this limit depends on gas flow velocity, means of ignition and the direction of flame propagation. Using a spark igniter and with a gas flow velocity of 5.7 cm/s, the leanest mixture which could be ignited in our test apparatus was 5.1% for upward flame propagation (burner in inverted configuration) and 9.3% for downward flame propagation (normal burner configuration). This compares with 4.1% and 9.0% respectively, for measurements made in a standard apparatus with static premixed gases using glowplug ignition. Optimization of the geometry, the mass-to-catalytically-reactive-surface-area ratio of the substrates and the placement and the length-to-diameter ratio of the platinum wires mounted thereon can bring these minimum ignitable values for the catalytic igniter down to or very near those achieved with the standard apparatus.

In a typical test sequence, the igniter to be tested was placed in the chimney with the valve to the vent open and the valve to the burner closed. Next, the flow rates of hydrogen and air were adjusted to produce the desired hydrogen concentration. To initiate the test, the valve to the burner was opened quickly and at the same time the valve to the vent was closed. After an induction time of 30 to 400 s, the catalytic igniter ignited the hydrogen-air mixture and the flame front traveled from the point of ignition to the burner surface where it was stabilized. As soon as ignition was detected, the position of the valves was reversed to extinguish the flame. For safety, the apparatus was located within the flow field of a hood which was vented to the outside so that any unburned hydrogen was diluted to an unignitable concentration before exiting from the laboratory.

The temperature of the igniter was monitored quantitatively with a Chromel/Alumel thermocouple and qualitatively with an infrared sensitive detector. Because the infrared energy emitted by a hot body is proportional to its temperature to the fourth power, the infrared detector is most sensitive to high temperatures and produces a large output change for a small change in temperature. Because of this, the infrared detector provided a good indication of the time of ignition. When gas phase ignition occurred, the temperature of the igniter dropped because the flame front moved away from the igniter to the burner surface. The rapid response time of the infrared detector aided the determination of precisely when ignition occurred.

A trace of the temperature of the igniter substrate as measured with the thermocouple and the infrared detector clearly shows the temperature drop which occurs after ignition. In addition to the substrate temperature measurements, thermocouple temperature measurements were also made in the region a few millimeters above the catalytic substrate. For these measurements, ignition of the gas phase mixture was indicated by a rise in temperature.

IGNITER DESIGN OPTIMIZATION

Figure 2B:
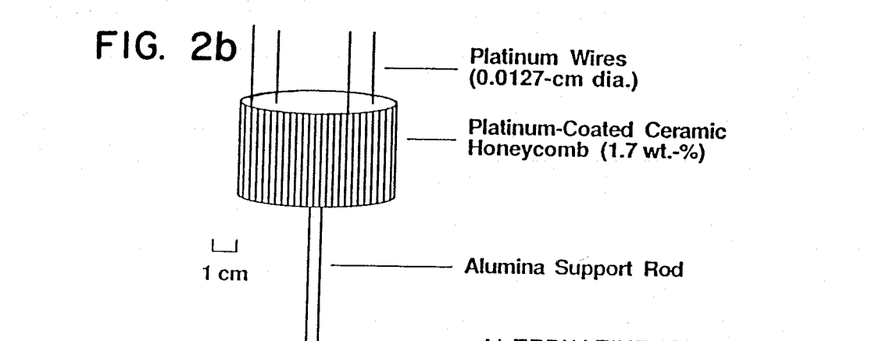

A schematic diagram of an operable but less active catalytic igniter of this invention is shown in FIG. 2a. It consists of a platinum coated honeycomb and platinum coil which is instrumented with a platinum/platinum - 13% rhodium thermocouple. The design which gave the best performance, viz. which ignited the leanest mixtures is shown in FIG. 2b. Three other designs which were successfully caused ignition and are shown in FIG. 3. The minimum hydrogen concentrations which were ignitable in the apparatus shown in FIG. 1 were FIG. 2a, 11%; FIG. 2b, 5.5%; FIGS. 3a and 3c 10.5%, and FIG. 3b, 11%.

With all of the successful igniter designs, the substrate first warmed and then the wires warmed and ultimately glowed red hot, which caused ignition. Small patches on the upstream surface of the substrate also glowed, but the patches were much less bright and more red than the wires. This observation provided qualitative evidence that the wires reached higher temperatures than the substrate and that the ignition occurred near the wires and not near the substrate.

From preliminary tests, it was determined that both a substrate coated with high surface area platinum and the platinum wires are critical for the device to ignite very lean mixtures. That both are needed to cause ignition indicates that there exists some interaction between them, which could be mechanical (e.g., disruption of the flow around the igniter), chemical (e.g., one igniter part supplying a necessary chemical species to the other) or thermal (e.g., one igniter part providing a temperature boost to the other).

The results of two separate experiments established that the mode of interaction is primarily thermal. The apparatus used for the first experiment was a coil of 0.0127 cm diameter Pt wire, used as an electrical resistance heater to raise the temperature of the 0.0726 cm diameter Pt wire whose catalytic ignition properties were to be determined. A Chromel/Alumel thermocouple was used to monitor the temperature of the wire. The Pt heater assembly and the Pt wire below the heater coil were carefully sealed in pyrex glass so they would not accidentally cause catalytic ignition of the hydrogen-air mixture. A Chromel/Alumel thermocouple was chosen to monitor the wire temperature rather than a platinum thermocouple for the same reason. To initiate the experiment, the platinum wire was heated electrically to a temperature high enough so that the chemical surface reaction would sustain itself without further electrical heating. At this point the electrical supply to the heater coil was disconnected. When the hydrogen concentration was high enough, the temperature of the wire continued to rise until gas phase ignition occurred. It was found that only a small temperature boost above room temperature was needed to cause the surface reaction on the wire to accelerate and ultimately ignite the gas phase. When heated to 80° C., the wire positioned in a vertical direction ignited mixtures as lean as 8.0% hydrogen. This compares to 8.5% for a horizontal wire. Even less boosting was required for a vertical 0.0127-cm diameter wire, i.e., heating to only 60° C. was sufficient.

In the second experiment, the temperature boost was provided by a platinum coated honeycomb ceramic catalytic substrate. One end of a 0.0726-cm diameter Pt wire was fastened to an alumina rod and the other end was bent so that it could touch the substrate. If the distance between the wire and the platinum-coated substrate were more than 0.1 cm, the platinum wire would not heat much above room temperature and ignition would not occur, even though the substrate heated to the usual temperature. If the wire touched the substrate, ignition occurred as usual, indicating that the wire had been thermally boosted by the substrate.

To test the importance of wire position, the wires were hung below the substrate with the burner in the inverted configuration. In this position, the wires were downstream from the substrate and the igniter failed to ignite a 11% hydrogen mixture. Presumably, leaner mixtures would not have been ignited either.

Results of these experiments support the following conclusions:

(1) both the platinum-coated substrate and the platinum wire are necessary, (2) the primary effect of the substrate is to provide a temperture boost to the platinum wire, (3) vertical positioning of the platinum wire is more effective than horizontal, (4) straight wires are better than coils and (5) the wires must project away from the substrate into the unreacted mixture.

Experiments were performed to determine the effect of wire diameter and length on igniter performance. Wire lengths of 1, 2, and 4 cm, and wire diameters of 0.0127, 0.0254 and 0.0726 cm were tested. The results, which are summarized in Table 1, showed that long, thin wires worked best, e.g., having a length of about 1 to 4 cm, preferably about 3 to 4 cm, and a diameter of from about 0.0127 cm to 0.0726 cm, preferably about 0.01 to 0.02 cm. We have not determined the lower limit for the wire diameter for wires which cause ignition. However, wires as thin as 0.001-cm diameter appear to be useable.

TABLE 1

Relationship of Platinum Wire Diameter and Length to Minimum Ignitable $H_2$ Concentration.

| Wire Diameter | Wire Length | Min. $H_2$ Concentration Needed for Ignition |
| --- | --- | --- |
| 0.0127 cm | 1.0 cm | 6.1% |
| 0.0127 cm | 2.0 cm | 5.5% |
| 0.0127 cm | 4.0 cm | 5.5% |
| 0.0254 cm | 2.0 cm | 5.5% |
| 0.0492 cm | 2.0 cm | 7.5% |
| 0.0726 cm | 2.0 cm | 8.5% |

PERFORMANCE OF PROTOTYPE IGNITER

The preferred prototype igniter shown in FIG. 2b was evaluated in terms of its response to hydrogen concentration, gas flow velocity, gas temperature, gas humidity and water spray. The ignition delay time was taken as a measure of the igniter's performance. The results are summarized below.

Hydrogen Concentration. For the inverted burner configuration (upward flame propagation) and a gas flow velocity of 2.8 cm/s, 5.5%, the leanest mixture which was tested, was successfully ignited. The leanest ignitable concentration for downward flame propagation was 11.6%. Hydrogen concentrations lower than 11.6% were ignited (as lean as 9.0%), but the flame stabilized on the catalytic substrate or moved upward to the edge of the chimney and extinguished. Only at concentrations of 11.6% or higher would the flame front propagate downward and stabilize on the burner surface. Thus, it appears that the 11.6% limit is strongly dependent on the gas flow velocity. Results of the hydrogen concentration tests indicate that the catalytic igniter can successfully ignite very lean hydrogen-air mixtures. These are within the concentration range of interest in nuclear reactor safety (4-13%). In fact, in the case of upward flame propagation the leanest mixtures ignitable with the catalytic igniter (5.5%) are only slightly more rich than the leanest mixtures ignitable with a spark (5.1%) indicating excellent igniter performance.

Flow Velocity. The effects of flow velocity for flows of 1.7, 2.8, 5.7, 8.6, 14.5 and 19.5 cm/s were examined for concentrations in the range of 5.5 to 11.5%. The ignition induction time (i.e., the time between the first exposure of the igniter to the hydrogen mixture and the time of the gas phase ignition) was taken as an indication of the effectiveness of the igniter, with shorter times indicating better performance. The results shown in FIG. 4 indicate that the effects of flow rate are greatest at low velocities, making the leaner hydrogen mixtures harder to ignite.

Humidity. The effects of humidity were tested by adding water vapor to the hydrogen-air mixture. This was accomplished by bubbling the mixture through a heated water bath. The bath consisted of a 5-cm diameter, 20-cm long copper cylinder filled with copper turnings and water. To prevent condensation of the water, the entire apparatus was heated to a temperature 2°–20° C. higher than the water bath, depending on the desired relative humidity (higher temperatures producing lower relative humidity). This provided a humidified mixture at the temperature of the apparatus but at a dew point (saturated vapor temperature) equal to the temperature of the water bath. The relative humidity was computed from psychrometric tables taking the temperature of the apparatus as the dry bulb temperature and the temperature of the water bath as the wet bulb temperature. The relative humidity calculated in this way is only approximate because the gas flow velocities in the apparatus are much lower than those typically used to make psychrometric humidity measurements. This means that the relative humidity computed for the apparatus may be slightly higher than the actual humidity.

The results showing the effect of humidity are given in FIG. 5 and Table 2. They indicate that humidified mixtures are more difficult to ignite and that the increase in the ignition delay is about a factor of three from the low humidity case to the 100% relative humidity case. The ignition delay times versus relative humidities data fit reasonably well a straight line having a slope of 3.11 ±0.40 s/% and an intercept of 169.7 ±21.3 s. Thus, the effect of high humidity is to delay but not prevent ignition.

TABLE 2

| Effects of Gas Flow Rate on Ignition Delay | | |
|---|---|---|
| Flow Velocity (cm/s) | Hydrogen Concentration (%) | Ignition Delay (s) |
| 1.7 | 8.0 | 170 |
|  | 9.0 | 144 |
|  | 11.0 | 60 |
| 2.8 | 5.6 | 194 |
|  | 6.0 | 115 |
|  | 7.0 | 78 |
|  | 8.0 | 74 |
|  | 9.0 | 60 |
|  | 11.0 | 46 |
| 5.7 | 5.5 | 199 |
|  | 6.0 | 38 |
|  | 7.0 | 41 |
|  | 8.0 | 36 |
|  | 11.0 | 35 |
| 8.6 | 5.2 | 124 |
|  | 5.5 | 82 |
|  | 6.0 | 47 |
|  | 7.0 | 53 |
|  | 8.0 | 43 |
|  | 9.0 | 46 |
|  | 11.0 | 41 |
| 14.6 | 5.5 | 41 |
|  | 6.0 | 37 |
|  | 7.0 | 31 |
|  | 8.0 | 23 |
|  | 9.0 | 19 |
|  | 10.9 | 14 |
| 19.5 | 5.2 | 36 |

TABLE 2-continued

| Effects of Gas Flow Rate on Ignition Delay | | |
|---|---|---|
| Flow Velocity (cm/s) | Hydrogen Concentration (%) | Ignition Delay (s) |
|  | 5.6 | 29 |
|  | 6.0 | 24 |
|  | 7.0 | 20 |
|  | 8.0 | 14 |
|  | 9.0 | 12 |
|  | 11.0 | 11 |

Temperature. The effect of gas temperature was investigated with the same apparatus used for the humidity studies except that there was no water in the bubbler and the entire apparatus was thermostated to a uniform temperature (within ±2° C.). The results are shown in FIG. 6. For the temperature interval tested, the data can be approximated by a straight line having a best fit intercept of 72.4 ±9.5 s and a slope of −0.76 ±0.22 s/°C.

Water Spray. Fine water droplets were misted onto the igniter until its mass increased by about 10% (5 g of water). The igniter failed to warm even when exposed to a 11% hydrogen-air mixture. After the liquid water had evaporated (after 24 hours), the igniter operated normally as before.

No Gas Flow. Tests of the catalytic igniter under zero gas velocity conditions were performed in the Fully Instrumented Test System (FITS) at Sandia, Albuquerque. These tests showed that the catalytic igniter successfully ignited dry static hydrogen-air mixtures as lean as 6.1% hydrogen and humidified mixtures as lean as 6.3%. Details of these tests are given in Table 3.

PRINCIPLE OF OPERATION

In order to fully optimize the igniter and to predict its behavior under a variety of conditions it is important to understand its principal of operation. Heating of both the platinum-coated substrate and the platinum wire depend on the catalytic reaction of hydrogen with oxygen on the platinum surface. The catalytic reaction occurs in the same way on the surface of the substrate and of the wire. On a per unit-area basis, the reaction rate for the wire and substrate is about the same. G. K. Boreskov, M. G. Slinko and V. S. Chesalova, Zh. Fiz. Khim. 30 2787 (1956); F. V. Hanson and M. Boudart, J. Catal. 53 56–57 (1978). The primary difference is that the effective surface area of the platinum on the substrate is enormous compared to that of the wire. Because of its high effective surface area, the substrate heats spontaneously in much leaner mixtures than does the wire. Conversely, because of its mass and larger volume, it heats to a much lower ultimate temperature than the wire.

The ignition sequence may be outlined as follows. Many of the processes proceed concurrently so their sequence below is somewhat arbitrary. The exact details of the surface chemical reaction mechanism are not fully known. P. R. Norton in "The Chemical Physics of Solid Surfaces and Heterogeneous Catalysis." D. A. King and D. P. Woodruff, eds. Vol. 4 Elsevier, Amsterdam (1982).

1. Diffusion of hydrogen and oxygen to the platinum surface.
2. Adsorption of hydrogen and oxygen on the surface. (Since the igniter is stored in air, the hydrogen is actually adsorbed on a surface preadsorbed with oxygen).

3. Dissociation of hydrogen on the surface. Norton, supra.
4. Reaction of H with O or $O_2$ on a surface to produce OH and heat. Norton, Gdowski et al, supra.
5. Reaction of H or OH with OH on surface to produce $H_2O$ and heat. Norton, Gdowski et al, supra.
6. Desorption of $H_2O$ from surface. Norton, supra.
7. Diffusion of hot $H_2O$ from surface (convective heat transfer to the gas phase).
8. Acceleration of surface reaction rate due to surface heating. Norton, Gdowski et al, supra.
9. Heat transfer from the catalytic substrate to the platinum wire and initiation of processes 4–7 on the wire surface.
10. Catalytic ignition of surface reaction on substrate (defined as the condition when the surface reaction rate is limited only by the diffusion rate of reactants to the surface). For lean mixtures, catalytic ignition may occur at relatively low temperatures (100°–300° C.). P. Cho and C. K. Law, Presented at the Western States Section of the Combustion Institute, Stanford, Calif., October, 1984.
11. Heating of the gases surrounding the igniter by conduction, convection and radiation.
12. Ignition of catalytic reaction on wires.
13. Heat transfer from wires to substrate.
14. Ignition of gas phase mixture near wire.
15. Propagation of the flame front away from the igniter.
16. Cooling of the igniter surface due to reduced supply of reactants to the surface.

Several of the above steps are discussed further below.

In Step 1, diffusion of reactants to the surface of the wires, is affected by the wire diameter. This can be understood in terms of a boundary layer surrounding the catalytic surface, defined as the region near the surface where the reactants are depleted relative to their concentrations in the bulk. Since the diffusion rate is proportional to the concentration gradient and the gradient is larger near the surface of an object with a smaller radius than one with a larger radius, the diffusion rate near the surface of a small diameter wire is more rapid than for a large diameter wire. We believe that this is why the smaller diameter wires are capable of igniting leaner mixtures than larger diameter ones. It is important to realize that this argument implies that the thickness of the boundary layer is comparable to or thicker than the diameter of the wire (0.02 cm for these experiments). If on the other hand, one ignores diffusion effects and one assumes that the concentrations at the surface are the same as they are in the bulk gas phase (i.e., no boundary layer exists), then according to model calculations made by R. W. Schefer (Sandia National Laboratories, Livermore, Calif., Private Communication), large diameter wires should heat to a higher temperature than small diameter wires. This is contrary to the results of our experiments and we therefore conclude that diffusion effects are important. It should be noted that Schefer's results may predict the correct dependence on wire diameter for very high gas velocities, in which case diffusion is less important than convective transport. In this regard, our studies show that higher flow velocity gas streams are easier to ignite than lower velocity streams. This suggests that for the range of velocities studied, heating of the wire surface is strongly influenced by the transport of reactants and products to and from the surface. Furthermore, convective mass transport more than compensates for the convective heat loss associated with higher gas velocities.

In Step 7 water desorbs from the platinum surface. Studies of the adsorption of water on platinum under ultra high vacuum conditions show that the binding energy of water to platinum is quite low (12 kJ/mol), Norton, supra. Further, there is no appreciable absorption at temperatures above 220 K., G. B. Fisher and J. L. Gland, Surf. Sci. 94 446–445 (1980). This means that water does not act as a poison toward the platinum and once the water has formed on the surface, it should desorb easily if the igniter is at room temperature or above. This is consistent with our observations that the igniter can be cycled repeatedly and that an igniter wet with liquid water will function normally after it has been dried. Our observations that a wet igniter will not warm indicates that the liquid water blocks most of the catalytic sites. The effects of humidity on ignition induction time can be understood in terms of the ability of the gas phase to take up water vapor produced from the surface reaction. If diffusion of water away from the platinum surface is the limiting step in determining the overall reaction rate, then the ignition induction time should be dependent on the ability of the gas phase to take up water, i.e. relative humidity. We have observed a close-to-linear dependence (FIG. 5). Water vapor should also affect the rate of diffusion of reactants to the surface, but this effect should be much smaller than the ability of the gas phase to carry away the reaction products (water vapor). This is because the diffusion rate of oxygen and hydrogen through air compared with their diffusion rate though air saturated with water vapor should be nearly the same. Thus, the effects of water are to reduce the available reactants by dilution and to retard the loss of water vapor from the platinum surface. Both effects lengthen the ignition induction time.

Step 9 is affected by the wire position. The wire must be exposed to the unreacted gas mixture in order for it to heat. When the wire is positioned vertically above the substrate with the burner in the inverted configuration, heat can be transferred convectively from the substrate to the wire by the heated gases exiting from the substrate which rises vertically due to buoyancy. The rising gas could also help to mix the gas near the surface of the wire, bringing in reactants and carrying away products. This could explain the observation that vertical wire position is better than horizontal. For downward flame propagation with the burner in the normal configuration, neither the heat transfer from the substrate to the wire nor the propagation of the flame front is aided by buoyancy and a richer mixture is required for the igniter to work properly as compared with the upward propagation case.

Further Improvements in Igniter Design

The following are several design parameters asociated with the catalytic igniter which should be considered in design. These are listed below.

Wire. Although the preferred embodiment described herein has four platinum wires placed around the edge of the substrate, the number of the platinum wires and their distribution on the surface of the substrate can be varied e.g., from 1 to 8 or more, preferably about 2 to 6, and their position on surface of the substrate can be varied, provided they meet the criteria of remaining in thermal conductive relationship with both the substrate and the hot gases exiting from the substrate and at least a portion of one or more of them is in communication with unoxidized gases. Platinum coated stainless steel or copper wire and platinum wires coated with platinum black, a high surface area platinum coating, are also useful. This latter type of coating should increase the reaction rate on the surface of the wires without appreciably affecting its heat transport characteristics.

Platinum-Coated Perforate Substrate. The substrate used in the experiments described herein was a perforated ceramic platinum-coated, honeycomb substrate with 1.6-1.7 wt % platinum. Catalytic substrates with higher platinum loading are available and should reduce ignition delay times. Since the transport of reactants to the substrate is affected by diffusion, the cell size of the honeycomb as well as the diameter and the thickness of the honeycomb itself can affect minimum ignitable hydrogen mixtures and the time delay in achieving combustion. Preferred substrates have a catalytic surface area of at least 50 $m^2/g$, e.g., about 50 to 300 $m^2/g$, preferably about 200 to 300 $m^2/g$, and a cell diameter of at least 0.1 cm preferably about 0.3 cm to 0.8 cm. Such large pore diameters enables lean hydrogen-air mixtures to freely pass through the substrate by convection current alone, so that the interior of the substrate is continually exposed to unoxidized gas mixture even in static and low gas flow situations. Conventional unglazed porous ceramic materials without such a cellular geometry do not permit sufficient gas flow to be useable. Operable ceramics have a flow conductivity per unit surface area of at least 0.1 and preferably 0.3 to 0.8 that of an open tube of the same area. Platinum wire as well as stainless steel or copper wire coated with platinum black are also useful as substrates (for example, in the form of a coiled screen), provided they have the requisite porosity and catalytic surface area. In our experiments, the up-stream face of the honeycomb (face closest to the burner) warmed first and reached higher temperatures than the down-stream face. This suggests that the optimum geometry for the honeycomb would have a larger, more open or graded cell size and that the substrate could be thinner than the one we used. In addition, the honeycomb which was used was deactivated by liquid water. Our preliminary tests using a "wet-proofed" platinum/Teflon-coated catalytic substrate developed at Chalk River Canada (A. I. Miller, Atomic Energy of Canada Limited, Research Company, Chalk River Nuclear Laboratories, Chalk River, Ontario, Canada, Private Communication), indicate that such a hydrophobic surface can provide the thermal boost needed to heat the wires in the presence of water mist, although it is not quite as effective as the honeycomb for very lean dry (below 10% hydrogen) mixtures. However, in some applications, the added benefit of the wet proofing outweighs the lower catalytic activity of the wet proof substrate.

The laboratory test of the non-powered catalytic igniter showed that the ignition delay time increases markedly for gas velocities below 10 cm/s. The laboratory test apparatus was not capable of making tests below 1 cm/s. Therefore, it was not possible to determine whether the catalytic igniter would ignite static hydrogen-air mixtures with that apparatus.

However, the Fully Instrumented Test System (FITS) employed in the following experiments provided an opportunity to test static mixtures. The FITS system consists of a large 5.6 $m^3$ cylindrical pressure vessel that is instrumented with a series of thermocouples and pressure gauges placed at various positions along the vertical center-line of the vessel. Additional thermocouples are located in other positions as well. A computer-controlled data acquisition system logs the elapsed time and the temperature and pressure data.

A test proceeds by first purging the vessel with air, then adding enough hydrogen to bring the final mixture to the desired hydrogen concentration. This mixture is then stirred with a pneumatic fan for 10 minutes to insure uniform concentration throughout the vessel. The mixture is then allowed to stand for 10 minutes to let any wind currents abate. At this point the igniter can be tested. The catalytic igniter is advanced by a pneumatically-driven piston from an argon-filled side arm on the vessel, through a ball valve, to near the center of the vessel. The argon in the side arm prevents the igniter from contacting the hydrogen-air mixture and warming prior to the desired start of the test. After a certain length of time (ignition delay time) ignition occurs and the temperature and pressure rises caused by the burning hydrogen are recorded by the computer-controlled data acquisition system. Tests were also made using glowplug and spark igniters in order to make comparisons with the catalytic igniter results. The same test procedure is followed for these igniters except that ignition was controlled by the operator by electrically energizing the igniter and the igniters were located inside the tank from the first rather than being moved into the tank from the side arm.

Ignition of dry and humidified mixtures were tested. Humidified mixtures were produced using a droplet generator located near the top of the vessel that produced micron-size drops. The generator was operated during the time the pneumatic fan was on and provided thorough humidification of close to 100% relative humidity.

The catalytic igniter was tested under four different conditions, with a wet or dry hydrogen-air mixture and with either 10% hydrogen or 6.5% hydrogen. The results of these tests are given in Table 3. Although there is considerable variability of the ignition delay times, the catalytic igniter successfully ignited dry 10% mixtures, wet 10% mixtures and dry 6.5% mixtures. The single wet 6.5% mixture tested required the fan to be turned on to provide flow across the igniter. The pressure and temperature rises inside the vessel after ignition by the catalytic igniter were virtually identical to those caused by glowplug and spark ignition as were the residual hydrogen concentrations after ignition. The implications of these tests for reactor safety are that the non-powered catalytic igniter of this invention is capable of igniting lean, static hydrogen air mixtures with hydrogen concentrations as low as 6.5% and humidified static mixtures with hydrogen concentrations as low as 10%. Humidified mixtures with hydrogen concentations below 10% may require a slight flow before the catalytic igniter is fully effective. Nevertheless, ignition by the catalytic igniter is just as effective at reducing the hydrogen concentration as ignition by a spark or glowplug. Moreover, the catalytic igniter has the advantage that no electrical power is required for it to operate.

TABLE 3

Results for the FITS tests. Data for glowplug and spark ignition are included for comparison with the novel catalytic igniter results. Two catalytic igniters CI A and CI B of the same design (FIG. 2b) were tested.

| Test | Device | % Hydrogen Pre-Test | % Hydrogen Post-Test | Humidity | Fans On (s) | Ignition Delay (s) |
|---|---|---|---|---|---|---|
| 1. | CI A | (10%)* | — | DRY | 300 | 305 |

TABLE 3-continued

Results for the FITS tests. Data for glowplug and spark ignition are included for comparison with the novel catalytic igniter results. Two catalytic igniters CI A and CI B of the same design (FIG. 2b) were tested.

| Test | Device | % Hydrogen Pre-Test | % Hydrogen Post-Test | Humidity | Fans On (s) | Ignition Delay (s) |
|---|---|---|---|---|---|---|
| 2. | CI B | 9.70% | 0.02% | DRY | NO | 76 |
| 3. | CI A | 9.62% | 0.02% | WET | NO | 172 |
| 4. | CI B** | 6.14% | 2.35% | DRY | 600 | 900 |
| 5. | CI B | 6.16% | 4.14% | DRY | NO | 405 |
| 6. | CI B | 6.16% | 3.04% | DRY | NO | 10 |
| 7. | CI B | (6%) | — | DRY | NO | 10 |
| 8. | CI B | 6.27% | 2.11% | WET | 600 | 665 |
| 9. | Glow-plug | 9.51% | 0.02% | DRY | NO | 15 |
| 10. | Glow-plug | 9.59% | 0.02% | DRY | NO | 15 |
| 11. | Spark | 6.13% | 4.65% | DRY | NO | 1 |
| 12. | Spark | 6.21% | 4.51% | DRY | NO | 1 |

*Values in parentheses are estimated initial concentrations based on the volume of hydrogen supplied to the test tank.
**Catalytic igniter rotated 90% from normal orientation. As anticipated, this caused longer ignition delays.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A catalytic igniter adapted for igniting a confined lean hydrogen-air gaseous mixture in a containing structure; the igniter being comprised of:
   (a) a non-combustible perforate catalytic substrate through which such a gaseous mixture can freely flow by convection current, about with a pressure drop of less than 0.2 atm, and having a catalytically active surface or surface coating with surface area of at least about 50 $m^2/g$, effective to raise the temperature of the substrate from ambient temperature to above about 80° C. within 200 seconds after the substrate is contacted with such a gaseous mixture; and
   (b) at least one catalytically active platinum surfaced metal wire mounted, in a thermally conductive manner, on the portion of substrate which becomes heated when contacted with a lean hydrogen-air gaseous mixture when the igniter is mounted in the substrate so as to be in thermally conductive communication with heated gases which have passed through the substrate and to be in catalytically effective communication with gases which have not passed through the substrate, the catalytic surface to mass ratio of the wire being effective to raise the temperature of the wire to at least red heat in a hydrogen-air mixture containing at least 5 vol % hydrogen only after the temperature of the substrate rises above about 80° C. while in such gas mixture.

2. An igniter according to claim 1, wherein the substrate is platinum coated honeycomb ceramic stucture.

3. An igniter according to claim 1, wherein the substrate is a platinum coated stainless steel screen.

4. An igniter according to claim 1, having a plurality of the metal wires mounted thereon.

5. An igniter according to claim 1, wherein the metal wire is positioned on a peripheral surface of the substrate.

6. An igniter according to claim 1, wherein the wire is a straight wire projecting axially upwardly relative to gravity from the surface of the substrate from which gases heated by contact with the substrate exit therefrom.

7. An igniter according to claim 1, wherein the metal from which the wire is formed is platinum.

8. An igniter according to claim 1, wherein the length of the wire is from about 1 to 4 cm and its diameter is from about 0.001 to 0.07 cm.

9. An igniter according to claim 1, wherein the substrate has a catalytically active surface with surface area of at least about 50 $m^2/g$.

10. An igniter according to claim 1, wherein the substrate is a platinum coated honeycomb ceramic structure having a catalytically active surface or surface coating with surface area of at least about 50 $m^2/g$; and wherein the substrate has a plurality of straight platinum wires mounted on the periphery of the surface which project axially upwardly relative to gravity from the surface of the substrate from which gases heated by contact with the substrate exit therefrom.

11. An igniter according to claim 10, wherein the length of the wire is from about 2 to 4 cm and the diameter is from about 0.001 to 0.07 cm.

* * * * *